June 10, 1924.

L. CRAYSSAC

PHOTOPRINTING FRAME

Filed Aug. 17, 1922

Inventor
Léon Crayssac
per *Powers*
Attorney.

June 10, 1924.
L. CRAYSSAC
1,497,290
PHOTOPRINTING FRAME
Filed Aug. 17, 1922　　2 Sheets-Sheet 2
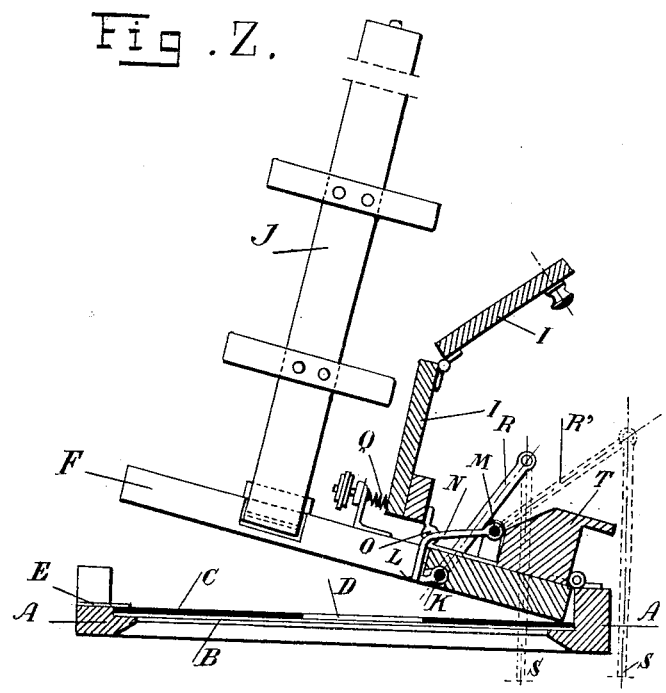
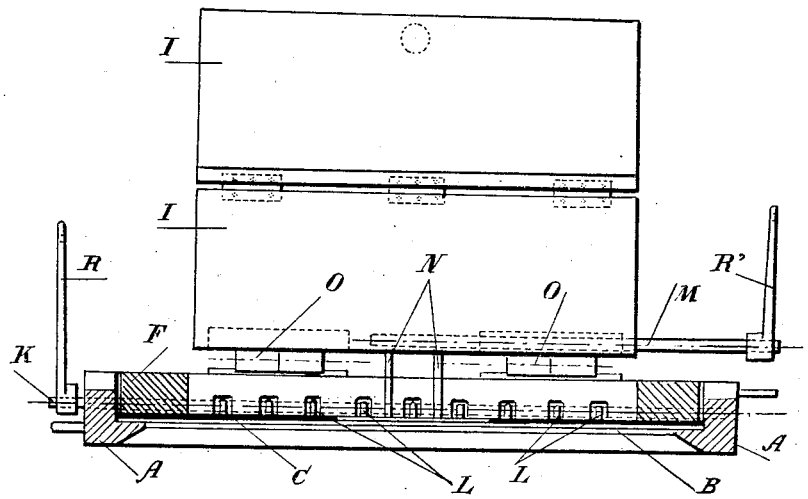
Inventor
Léon Crayssac
per
Attorney.

Patented June 10, 1924.

1,497,290

UNITED STATES PATENT OFFICE.

LÉON CRAYSSAC, OF MARSEILLE, FRANCE.

PHOTOPRINTING FRAME.

Application filed August 17, 1922. Serial No. 582,522.

*To all whom it may concern:*

Be it known that I, LÉON CRAYSSAC, citizen of the Republic of France, residing at Marseille, in the Republic of France, have invented certain new and useful Improvement in Photoprinting Frames, of which the following is a specification.

My invention relates to a photo printing frame with automatic adjustment and provided with two independent sets of grips, the one keeping in its proper position the negative, the other keeping in its proper adjusted place the positive to be printed during operation; the negative being of the plate or of the film-pack type.

The object of the invention is also to provide a photo printing frame in which without particular skill, any operator is capable of obtaining exactly placed prints, with a uniform margin on all sides, very quickly and without exertion.

With the foregoing and other objects in view, which will appear as the specification proceeds, the invention consists in the novel features of construction and combination of parts thereinafter described and particularly pointed out in the claims.

In the drawings accompanying and forming part of this specification:

Fig. 2 is a transversal vertical section of the frame, on line 1—1, with the shutters opened.

Fig. 4 is a transversal vertical section of the frame, on line 2—2 of Fig. 1 with the foldable portion of the shutters lifted.

Referring more particularly to the drawings, the apparatus is composed of a rigid frame A provided with a sheet B of transparent material as in all known printing frames.

On the transparent sheet B of the frame rests a metal sizing diaphragm C having a central cut out portion D corresponding in form and size with the print to be obtained, and this interchangeable diaphragm engages in a flat groove constituted by a metal protruding blade E fixed upon the thinner border of one of the sides of the printing frame; the diaphragm being kept in its proper position by the rigid portion F of the shutter. The diaphragm is perforated in proximity of one of its corners for reference purposes and so as to allow the hanging up of the diaphragm when not in use.

The part of the apparatus corresponding to the shutter of the usual printing frames is in two parts, the one of which, F, is rigid, cut out in U shape and forms the counter shutter firmly maintaining the diaphragm C in position; this portion of the shutter is connected to one side of the frame A by means of hinges and is kept closed by means of screws or spring latches disposed on the opposite side of the frame and engaging the arm ends of the U shaped shutter portion. This rigid portion is provided with hinges connecting it to the foldable portion 1 of the shutter, and carries a spring bar J pressing on the foldable portion of the shutter in the closed position, as well as two spring operated knee lever shafts K and M each provided with their respective sets of grips L and N serving the one to hold firmly in position after adjustment the negative to be reproduced a number of times and the other the positive to be obtained, adjusted in position by means of the reference marks disposed on the thickness of the U shaped portion of the shutter.

Figure 1:
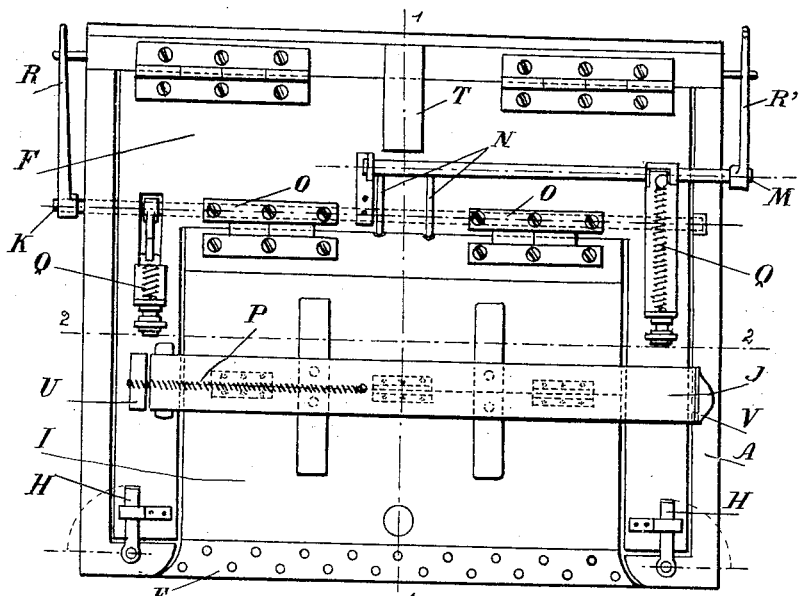
Fig. 1 is a plan view of the photo printing frame with the shutters closed.
Figure 3:
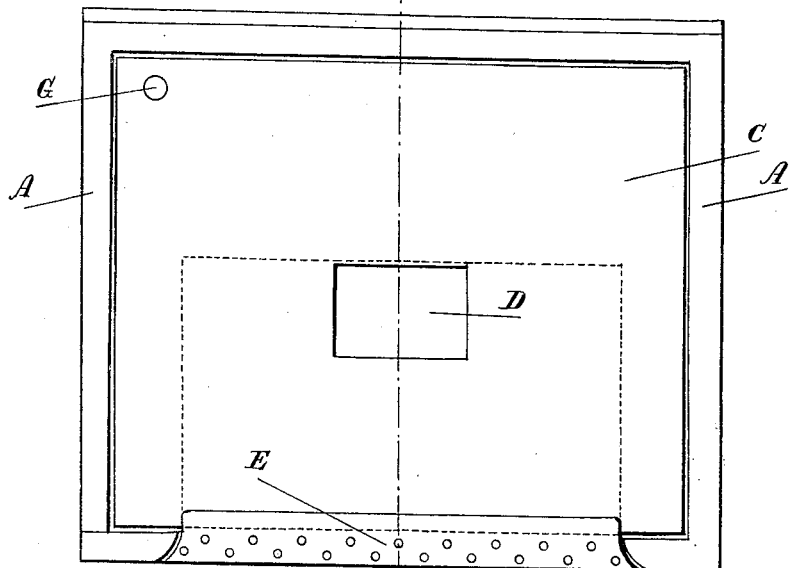
Fig. 3 is a plan view of the frame with the shutters taken away, to show one of the sizing diaphragms in working position.

The hinges O connecting the rigid U shaped portion of the shutter with the foldable portion are disposed so as to allow (Figs. 1 and 4) the free passage of the one set of grips N holding the positive to be printed through the abutting thicknesses of the two shutter portions.

The spring bar J pressing on the foldable portion of the shutter is provided with a coiled or flat spring P automatically lifting the bar when the spring latch or lock V keeping the bar in its closed position is released.

The knee lever shafts K and M respectively holding firmly with their grips the negative and the positive in the adjusted printing position are operated and replaced into position by the springs Q. The levers R R' of the spring operated knee shafts may conveniently be connected by links S to pedals placed on both sides of the printing frame stand.

Reference marks serving to exactly adjust the position of the positive to be printed are provided on the thickness of the rigid portion of the shutter and below hinges O.

A resting arm T is provided against which the foldable portion of the shutter comes to lean in the opened position.

The apparatus works as follows:

The sizing and shaping diaphragm corresponding in form and dimensions with the negative from which prints are to be obtained is placed in its correct position inserting the one edge in the groove of the framing, locking down afterwards the rigid U shaped portion of the shutter; this done, the negative is adjusted in position under the set of grips of the knee lever shaft K whilst the grips are kept lifted bearing on the one pedal during the adjustment; afterwards the paper or positive to be printed is placed in position under the set of grips of knee lever shaft M adjusting it exactly with help of the reference marks provided on the thickness of the shutter whilst the grips are lifted bearing on the other pedal. It will be enough, afterwards to close down the foldable part of the shutter and lock it in lowering the spring bar to make the apparatus ready for exposure to light.

To put in position another positive to be printed, the spring bar is first released, the foldable portion of the shutter lifted and brought to lean on its resting piece, the pedal commanding the operation of the set of grips of shaft M is depressed thus lifting the grips, the print is taken away and replaced by the fresh positive to be printed, adjusted and firmly held as set forth above.

With such an apparatus it is possible to print very rapidly and without special exertion a great number of positives, and owing to the reference marks provided on the thickness of the shutter, to obtain them all with a blank border of very regular shape.

Between the sizing diaphragm and the U shaped part of the shutter a small space may be carved out to allow for the introduction of a negative larger in size than the print to be obtained so as to be able to slide the negative under the shutter.

Form, dimension and materials may very according to special purposes.

What I claim as my invention is:

1. A photo printing frame for plate or film pack negatives comprising a rigid frame portion, a transparent sheet mounted therein, a groove in one side of the frame, a sizing diaphragm fitted in said groove and cut away in its central portion to correspond with the printed surface to be obtained; a rigid shutter cut out in the form of a U and hinged to the frame and kept closed whilst working by disengageable locking organs disposed on the outer extremities of the U shaped shutter, means carried on this shutter for retaining the negative in adjusted position during operation, means on the same shutter for retaining the positive in adjusted position during the operation, a foldable shutter filling up the cut away portion of the U shaped shutter and hingedly connected thereto, a spring bar engaging the arms of the rigid shutter and holding the foldable shutter in the closed position during the operation, and a plurality of reference marks on the part of the U shaped shutter abutting with the foldable shutter.

2. A photo printing frame for plate or film pack negatives comprising a rigid frame portion, a transparent sheet mounted therein, a centrally cut out sizing diaphragm carried in the frame, a U shaped rigid closing shutter hinged to the framing and retaining the diaphragm in place, means for gripping the negative and retaining same in position during operation consisting of a spring actuated releasable knee lever, a shaft therefor and grippers disposed in the thickness of the rigid shutter, releasable means on this shutter to grip and keep in adjusted position the positive to be printed, a foldable shutter filling up the cut away portion of the U shaped shutter and hingedly connected thereto, a spring bar engaging the arms of the rigid shutter for retaining the foldable shutter in its closed position, and a plurality of reference marks disposed on the thickness of the part of the U shaped shutter abutting with the foldable shutter.

3. A photo printing frame for plate or film-pack negatives comprising a rigid frame portion, a transparent sheet mounted therein, a centrally cut away sizing diaphragm carried in the frame, a U shaped rigid closing shutter hinged on the framing and retaining said diaphragm in position, releasable means for gripping and retaining the negative in position during operation; releasable means on the rigid shutter for gripping and retaining the positive in position during operation, the latter means consisting of a spring actuated releasable knee lever, a shaft therefor, and a set of grippers extending through the thickness of the rigid shutter, a foldable shutter filling up the cut away portion of the U shaped shutter and hingedly connected thereto, and a spring bar engaging on the ends of the rigid shutter for retaining the foldable frame in its closed position, and a plurality of reference marks disposed on the thickness of the part of the U shaped shutter abutting with the foldable shutter.

In testimony whereof I affix my signature in presence of two witnesses.

LÉON CRAYSSAC.

Witnesses:
 EUGÈNE DUCANORE,
 EUGENE LEFEBVRE.